United States Patent

Siegel

[15] 3,704,512
[45] Dec. 5, 1972

[54] UNITARY ELECTRO-OPTIC ARRAY DEVICE MAKING PROCESS

[72] Inventor: Arthur R. Siegel, Yorktown Heights, N.Y.

[73] Assignee: International Business Machines Corporation, Armonk, N.Y.

[22] Filed: Nov. 29, 1968

[21] Appl. No.: 779,826

[52] U.S. Cl.............29/572 R, 29/25.16 R, 29/592 R, 29/597 R, 350/160 R, 350/150 R
[51] Int. Cl. ..........................H01c 7/00, H01j 15/02
[58] Field of Search..............29/592, 600, 601, 572; 350/160, 150

[56] References Cited

UNITED STATES PATENTS

| 3,479,109 | 11/1969 | Preston | 350/160 X |
| 3,256,471 | 6/1966 | Coles | 29/630 D |
| 3,245,313 | 4/1966 | Zaromb | 350/160 |
| 3,021,589 | 2/1962 | Weller | 29/630 D UX |
| 1,802,747 | 4/1931 | Zworykin | 350/150 X |
| 3,540,427 | 11/1970 | Anderson | 29/592 UX |

OTHER PUBLICATIONS

Electronically switched Polychromatic Filter, Western Electric Tech Digest No. 3–7–66, by Duane Jr.

*Primary Examiner*—John F. Campbell
*Assistant Examiner*—Robert W. Church
*Attorney*—Hanifin and Clark and George Baron

[57] ABSTRACT

An array of electro-optical units in the form of a unitary device is formed. A single electro-optical crystal, such as lithium, niobate, or its equivalent, has a number of parallel slots cut into the body of the crystal. Each slot is filled with an electrically conductive foil that is made to adhere to the walls of the slot using an electrically conductive adhesive. The foils extend beyond the boundaries of the crystal to serve as electrodes.

1 Claim, 4 Drawing Figures

FIG. 3
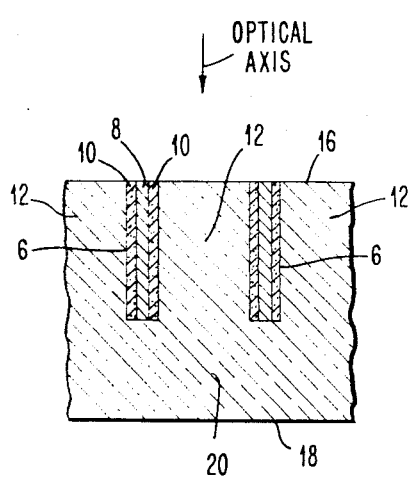
FIG. 2
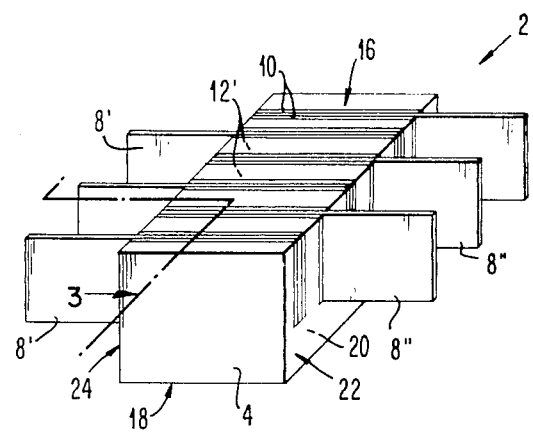
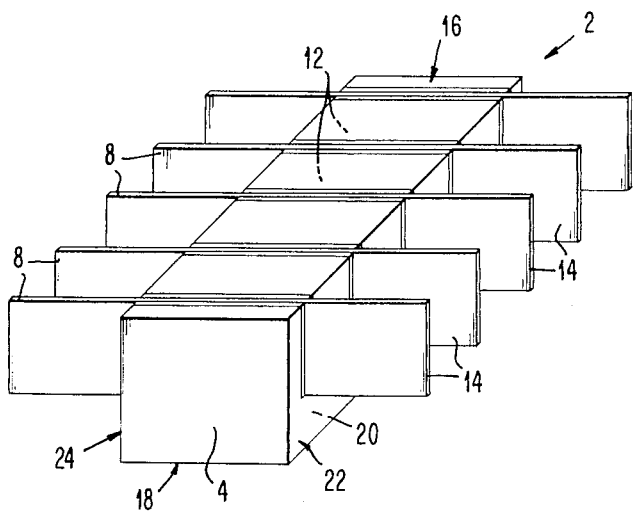
FIG. 1
INVENTOR
ARTHUR R. SIEGEL
BY
ATTORNEY

UNITARY ELECTRO-OPTIC ARRAY DEVICE MAKING PROCESS

CROSS-REFERENCE TO RELATED APPLICATIONS

An electro-optic array and method for making an array are shown and described in a copending application, Ser. No. 737,132, filed on June 14, 1968 now U.S. Pat. No. 3,540,427 issued Nov. 17, 1970, for an invention titled "An Electro-Optic Array and Method of Making Same" and filed for John P. Anderson. Such invention is a variation of the present invention in that Anderson uses an electroless-plating procedure for depositing electrically conducting electrodes for his array and employs a gold-indium eutectic as the electrode material.

BACKGROUND OF THE INVENTION

Certain memories, particularly those that are addressed by a beam of light, require a laser source whose output beam can be rapidly scanned among a large number of discrete directions. As part of the scanning mechanism, an array of electro-optical elements are placed on each mirror forming the outer portions of the laser cavity. These arrays are oriented so that all parallel electro-optical elements in one array on one mirror are perpendicular to all the parallel electro-optical elements of the first array has a voltage applied across it, all transverse modes but one are extinguished. When only one electro-optical element of the second array has a voltage applied across it, then all longitudinal modes but one are extinguished. Thus, by simultaneously actuating two electro-optical elements, one in each array, two orthogonal light beams are supported in the laser cavity. The intersection of such two orthogonal beams produces a point of light. By rapidly selecting different pairs of electro-optical elements, one in each array, a spot of light can be scanned.

In the manufacture of a unitary slotted crystal matrix of electro-optical elements, it is desirable to obtain an array that will fit into a laser cavity and, as such, should be quite small. Furthermore, the slots that are produced in a crystal must be quite narrow in width, be self-supporting, and be parallel so that any electrodes placed on both sides of a slot will create, when potentials are applied thereto, a uniform deflecting field throughout the length of the slot.

In achieving a unitary device, the electro-optical block or crystal is cut in parallel slots that are parallel to the optical axis of the crystal. Such cutting is achieved in the manner set forth in the above noted copending application by John P. Anderson, namely, by using a cutting string on which is carried a continuous supply of slurry. After the parallel cuts are made, the cutting strings are removed by a floatation step, and gold foil is glued to both sides of the slab that is formed by the parallel cuts. An electrically conducting epoxy is used to glue the gold foil to the slabs, enough glue being used to take up the space left between gold foil and slab, with the gold foils being longer than the length of the slab so that they protrude beyond the parallel faces of the crystal. These protruded portions become the electrodes to which suitable potentials are applied so as to permit the deflection of light that passes through the crystal and between two adjacent electrodes.

Consequently, it is an object of this invention to provide a unitary array of electro-optical elements incorporated in a single block of electro-optical material.

It is another object to provide a simple but accurate method for achieving a small array of electro-optical elements in a single crystal whereby each element is substantially the same as any other element in that array.

The foregoing and other objects, features and advantages of the invention will be apparent from the following more particular description of preferred embodiments of the invention, as illustrated in the accompanying drawings.

DESCRIPTION OF THE DRAWINGS

FIG. 1 is a showing of one embodiment of the novel electro-optical array.

FIG. 2 is a modification of the array shown in FIG. 1.

FIG. 3 is a detailed showing of a pair of electro-optical elements forming part of the array.

Figure 4:
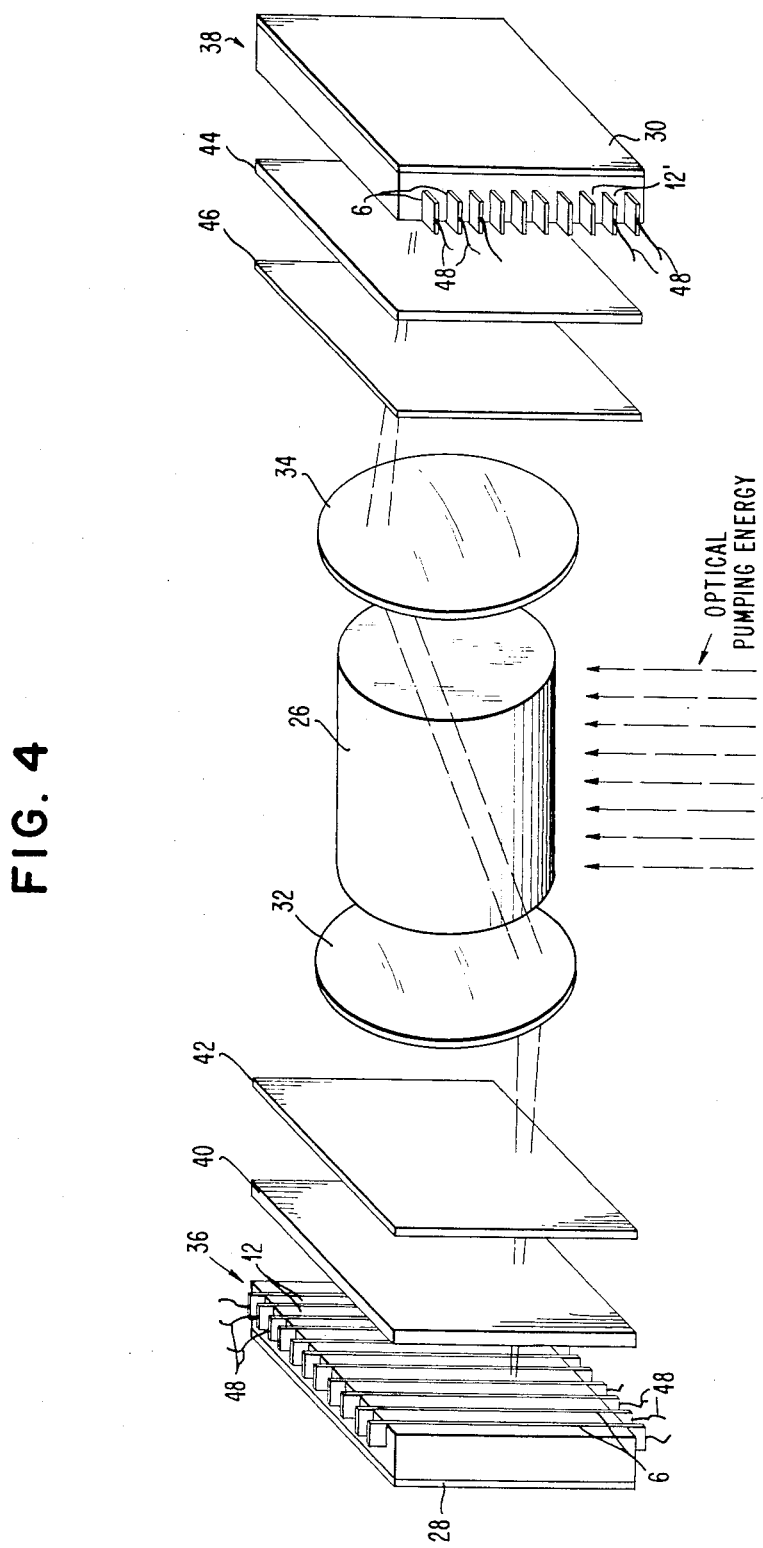
FIG. 4 is a schematic showing of a laser system wherein the electro-optical arrays forming the present invention are used to achieve digital mode selection.

The array 2 is made by starting with block 4 of electro-optical material. The array is easier to manufacture if the electro-optic material 4 can be cut into thin slabs without chipping or cracking. An exemplary, though not limiting, material would be lithium niobate. The crystal or block 4 is inserted in a suitable jig and parallel cuts or slots 6 are made into the block. As described in the copending application Ser. No. 737,132, one can employ a series of parallel string cutters that produce such slots 6.

After the cuts have been made and the string cutters are removed from the block and cleaned of slurry and lithium niobate powder, gold foils 8 are inserted into each slot. Prior to insertion of the gold foil 8 into the slot 6, the sides of the foil are painted with an electrically conductive glue, an example of which is silver epoxy E-solder 3021 made by Epoxy Products Co., New Haven, Conn., a Division of Allied Products Company. The silver epoxy 10 (see FIG. 3) is allowed to dry for eight hours at room temperature with the excess silver epoxy being removed prior to the heating process. As is shown in FIG. 1, the cuts are made parallel to the optical (C-axis) axis of the crystal 4 so that the slabs 12 that are produced by the cuts are also parallel to the C-axis. The gold foil protrudes beyond the width of the block 4 in that such protrusions 14 serve as electrodes to which suitable potentials can be applied.

Dimensionwise, an array would comprise slabs 12 that are of the order of 0.0012 inches wide, 0.24 inches deep and 0.0005 inches for the width of each cut made in the lithium niobate crystal.

After the crystal has been supplied with the gold foil electrodes, the top portion 16 and the bottom portion 18 are polished with a diamond compound to a flatness and parallelism of the order of one-tenth of a wavelength of light. The uncut portion 20 of the crystal serves as a support of the slabs 12 and its dimensions are chosen, particularly when used in a laser system, to attenuate a laser beam passing through the array.

If the crystal 4 that is chosen is of a comparatively fragile nature, as compared to lithium niobate, then cuts 6 can be made relatively far apart so that the slab 12 that is initially produced is relatively wide. The gold foil 6 is glued to these slots 6 in the manner described above. After the glue or silver epoxy 10 has hardened, then additional cuts can be made intermediate of the two original cuts, in that the silver epoxy and gold foil have served to give rigidity to that portion of the crystal that was initially cut. In this manner, a number of intermediate slots can be cut and then supplied with gold foil and silver epoxy. While the second process is much slower than the first, it is recommended where the crystal 4 that has been selected to compose the electro-optic array has poorer cutting characteristics than a material such as lithium niobate.

FIG. 2 shows a variation of FIG. 1 wherein the gold foils 8 are inserted and glued in an alternate fashion. For example, gold foil 8' terminates at the surface 22 of crystal 4 but protrudes beyond surface 24 of crystal 4. On the other hand, gold foil 8'' protudes beyond surface 22, but terminates at surface 24 of crystal 4. These alternations of the gold foil 8 continue throughout the length of the crystal. This embodiment is recommended where the slabs 12 are extremely thin, making the addition of electrodes to such films difficult. Thus, potentials to be applied to a particular slab, such as slab 12' of FIG. 2, would be applied to protruded portions of films 8' and 8''.

The arrays described above are capable of use in many optical systems wherein many narrow beams of light must be deflected individually or in various combinations. One particular application of such an array would be a "scanlaser," a system designed to rapidly move a spot of light produced in a laser cavity along one of the mirrors of such cavity to provide a scanning effect. Such a "scanlaser" is described in detail in an article titled "The Electron Beam Scanlaser: Theoretical and Operational Studies" by R. A. Myers and R. V. Pole which appeared in the *IBM Journal of Research and Development*, Vol. 11, No. 5, September 1967, Pp. 502–510.

In the laser system of FIG. 4 there is shown an active medium 26 composed of a rod of ruby, or yttrium-aluminum-garnet (YAG) doped with neodymium, that is placed in the resonant cavity so that the mirrors 28 and 30 lie in the focal planes of lenses 32 and 34 respectively. Each matrix or array 36 and 38, such as the completed array of FIGS. 1 or 2, is placed adjacent a mirror, array 36 is located in close proximity to mirror 28 with its slabs 12 of $LiNbO_3$ vertically oriented and matrix 38 is located adjacent to mirror 30 with its slabs 12' oriented horizontally. Birefringent plate 40 and polarizer 42 are interposed between lens 32 and array 36 whereas birefringent plate 44 and polarizer 46 are located between lens 34 and array 38.

When the active medium 26 is optically pumped, lasing is prevented from occurring in that a polarized beam B of light would traverse the lens 34, be polarized as it passed through polarizer 46, and then will have circular polarization imparted to it by the birefringent plate 44, the latter being, in effect, a $\lambda/4$ plate for the lasing light. If no voltage is selectively applied to any of the pair of wires 48 of the array 38, the lasing light is reflected from the mirror 30 and returns so that the quarter-wave plate 44 causes the polarization of the reflected light to be rotated, such rotation causing polarizer 46 to act as an analyzer to such additionally rotated light and prevent its passage back towards the active medium 26. The same situation applies to the light being reflected from mirror 28.

In general, if no selected voltages are applied to the pair of electro-optical arrays 36 and 38, birefringent or quarter-wave plates 40 and 44 attenuate the respective reflections of light in the cavity from mirrors 36 and 30. But when one horizontal slab of $LiNbO_3$ from one array, i.e., array 38, and one vertical slab of $LiNbO_3$ of the other array 36, are each actuated by applying suitable electrical potentials to their respective electrodes, then a vertical line and a horizontal of lasing light are not attenuated by their respective quarter-wave plates 40 and 44. As a consequence, the intersecting orthogonal lines of light produce a spot of light on either mirror 28 and 30 and, by rapidly selecting different orthogonal slabs of $LiNbO_3$, one obtains a rapidly moving spot of light.

An array of electro-optical deflectors, when made as a small unitary device, finds wide application in devices where rapid switching speeds are desired and low electrical potentials are needed. For example, holographic memories require a laser source whose output beam can be rapidly scanned among a large number of discrete directions. The array described hereinabove is capable of being manufactured so that each slab 12 is about 0.1 inch long in the direction of light propagation and only 0.006 inch thick along the direction of applied electric field, and potentials of the order of 50 volts or less are needed to rotate the plane of polarization through a slab of electrooptical material.

While the invention has been particularly shown and described with reference to preferred embodiments thereof, it will be understood by those skilled in the art that the foregoing and other changes in form and details may be made therein without departing from the spirit and scope of the invention.

I claim:

1. A method of fabricating from a single rectangular crystal an array of electro-optical elements as a unitary device comprising the steps of:
   a. producing a plurality of parallel slots within a portion of the body of said crystal, said slots being parallel to the optic axis of said crystal and sufficiently spaced apart so that the slab of electrooptical material between each pair of adjacent slots is self-sustaining,
   b. imbedding a metal foil to each of said slots using an electrically-conductive adhesive to permanently affix each foil to its corresponding slot whereby each foil extends beyond the edges of each slot,
   c. producing, after said adhesive has hardened, additional slots intermediate and parallel to said initial slots,
   d. imbedding a metal foil to each of said additional slots using an electrically-conductive adhesive to permanently affix each foil to its corresponding additional slot whereby each foil extends beyond the edges of said additional slots, and
   e. polishing the two opposing faces of said rectangular crystal that are perpendicular to the optical axis to a parallelism of the order of one-tenth wavelength of light.

\* \* \* \* \*